United States Patent
Fisher (10) Patent No.: US 10,451,113 B2
(45) Date of Patent: Oct. 22, 2019

(54) BEARING CAGES FOR ROLLER BEARING ASSEMBLIES

(71) Applicant: General Electric Company, Schenectady, NY (US)

(72) Inventor: Kenneth Lee Fisher, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/598,615

(22) Filed: May 18, 2017

(65) Prior Publication Data

US 2018/0335086 A1    Nov. 22, 2018

(51) Int. Cl.
| | |
|---|---|
| *F16C 33/46* | (2006.01) |
| *F16C 19/26* | (2006.01) |
| *F16C 33/66* | (2006.01) |
| *F01D 25/16* | (2006.01) |

(52) U.S. Cl.
CPC .......... *F16C 33/4605* (2013.01); *F01D 25/16* (2013.01); *F16C 19/26* (2013.01); *F16C 33/4629* (2013.01); *F16C 33/6677* (2013.01); *F16C 33/6681* (2013.01); *F05D 2240/54* (2013.01); *F16C 2360/23* (2013.01)

(58) Field of Classification Search
CPC .......... F16C 33/6677; F16C 33/6681
See application file for complete search history.

(56) References Cited

U.S. PATENT DOCUMENTS

| | | | | |
|---|---|---|---|---|
| 2,838,348 | A | * 6/1958 | Hamm | F16C 33/3843 |
| | | | | 384/466 |
| 3,531,167 | A | * 9/1970 | Blea | F01D 25/18 |
| | | | | 384/475 |
| 3,597,031 | A | * 8/1971 | Bill | B01D 35/02 |
| | | | | 384/470 |

(Continued)

FOREIGN PATENT DOCUMENTS

| | | |
|---|---|---|
| EP | 2803436 A2 | 11/2014 |
| JP | 2008002659 A | 1/2008 |
| WO | 2014143876 A1 | 9/2014 |

OTHER PUBLICATIONS

Shoda et al., "The Performance of a Hybrid Ceramic Ball Bearing Under High Speed Conditions with the Under-Race Lubrication Method", Tribology Transactions, vol. 40, Issue: 4, pp. 676-684, 1997.

*Primary Examiner* — Thomas R Hannon
(74) *Attorney, Agent, or Firm* — Armstrong Teasdale LLP (57) ABSTRACT

A bearing cage for a roller bearing assembly. The roller bearing assembly includes an inner ring, an outer ring, and a plurality of roller elements. The bearing cage includes an annular body extending along an axial direction. The annular body is configured to be positioned between the inner annular ring and the outer annular ring and configured to receive a plurality of roller elements. The annular body includes a first end including a first inner radial surface opposite the inner annular ring. The annular body further includes a second end opposite the first end. The second end includes a second inner radial surface opposite the inner annular ring. The first end extends axially beyond the inner annular ring and the second end extends axially beyond the inner annular ring.

20 Claims, 5 Drawing Sheets

(56) References Cited

U.S. PATENT DOCUMENTS

| | | | | |
|---|---|---|---|---|
| 4,345,799 | A * | 8/1982 | Crofts | F16C 33/3843 384/470 |
| 4,384,749 | A | 5/1983 | Schaefer | |
| 4,797,014 | A * | 1/1989 | Nicolich | F01D 25/16 384/475 |
| 6,409,464 | B1 | 6/2002 | Fisher et al. | |
| 8,123,413 | B2 | 2/2012 | Tambe et al. | |
| 8,172,717 | B2 | 5/2012 | Lopez et al. | |
| 8,198,744 | B2 | 6/2012 | Kern et al. | |
| 8,235,861 | B2 | 8/2012 | Lopez et al. | |
| 8,287,423 | B2 | 10/2012 | Lopez et al. | |
| 8,292,511 | B2 * | 10/2012 | Gibbons | F16C 33/6651 384/462 |
| 8,298,114 | B2 | 10/2012 | Lopez et al. | |
| 8,459,872 | B2 | 6/2013 | Nies et al. | |
| 8,491,435 | B2 | 7/2013 | Ghanime et al. | |
| 8,506,446 | B2 | 8/2013 | Minadeo et al. | |
| 8,517,612 | B2 | 8/2013 | Metzger et al. | |
| 8,517,672 | B2 | 8/2013 | McCooey | |
| 8,550,955 | B2 | 10/2013 | Erno et al. | |
| 8,550,957 | B2 | 10/2013 | Erno et al. | |
| 8,616,777 | B1 | 12/2013 | Smith et al. | |
| 8,657,714 | B1 | 2/2014 | Ghanime et al. | |
| 8,696,314 | B2 | 4/2014 | Mashue et al. | |
| 8,727,629 | B2 | 5/2014 | Do et al. | |
| 8,777,802 | B2 | 7/2014 | Erno et al. | |
| 8,834,033 | B2 * | 9/2014 | Thomas | F16C 33/60 384/506 |
| 8,857,192 | B2 | 10/2014 | Huang et al. | |
| 8,904,746 | B2 | 12/2014 | Fang et al. | |
| 9,181,981 | B2 * | 11/2015 | Dobek | F16C 33/6659 |
| 9,194,429 | B2 * | 11/2015 | Ashmore | F16C 33/38 |
| 9,194,432 | B2 * | 11/2015 | Ashmore | F16C 33/6614 |
| 9,441,541 | B2 * | 9/2016 | Wotzak | F01D 25/18 |
| 2006/0062504 | A1 | 3/2006 | Wilton et al. | |
| 2007/0248295 | A1 * | 10/2007 | Kerr | F16C 33/3843 384/470 |
| 2010/0086247 | A1 | 4/2010 | Walker | |
| 2013/0149141 | A1 * | 6/2013 | Siniawski | F01D 25/164 415/229 |

* cited by examiner

BEARING CAGES FOR ROLLER BEARING ASSEMBLIES

BACKGROUND

The field of the disclosure relates generally to rotary machines and, more specifically, to bearing cages for roller bearing assemblies.

At least some known turbomachines include one or more shafts which are rotatably supported by several known bearings, typically of a rolling-element type. These known bearings in the turbomachine are usually a combination of roller bearings and ball bearings and are enclosed in sumps, which are pressurized and receive an oil flow for lubrication and cooling. The roller bearings support radial loads induced by the shafts and the ball bearings support radial and thrust loads induced by the shafts.

Some known roller bearing assemblies include an annular inner ring coupled to the shaft and an annular outer ring, with a plurality of rollers circumferentially spaced about a center axis therebetween. The roller bearing assembly further includes a bearing cage that is positioned between the inner and outer rings to receive the rollers. These roller bearing assemblies may also be used in a planetary bearing assembly. At least some planetary bearing assemblies include 3-6 roller bearing assemblies circumferentially spaced about a planetary center axis. Each roller bearing assembly is rotatable about its center axis, and the entire planetary bearing assembly is rotatable about its planetary center axis. With multiple axes of rotation centrifugal forces on each roller bearing assembly are increased. As such, the bearing cage increases contact with the inner ring, thereby accelerating wear within the roller bearing assembly.

BRIEF DESCRIPTION

In one aspect, a bearing cage for a roller bearing assembly is provided. The roller bearing assembly includes an inner annular ring, an outer annular ring, and a plurality of roller elements. The bearing cage includes an annular body extending along an axial direction. The annular body is configured to be positioned between the inner annular ring and the outer annular ring and configured to receive the plurality of roller elements. The annular body includes a first end including a first inner radial surface opposite the inner annular ring. The annular body further includes a second end opposite the first end. The second end includes a second inner radial surface opposite the inner annular ring. The first end extends axially beyond the inner annular ring and the second end extends axially beyond the inner annular ring.

In another aspect, a roller bearing assembly is provided. The roller bearing assembly includes an inner annular ring, an outer annular ring, a plurality of roller elements, and a bearing cage. The bearing cage includes an annular body extending along an axial direction. The annular body is configured to be positioned between the inner annular ring and the outer annular ring and configured to receive the plurality of roller elements. The annular body includes a first end including a first inner radial surface opposite the inner annular ring. The annular body further includes a second end opposite the first end. The second end including a second inner radial surface opposite the inner annular ring. The first end extends axially beyond the inner annular ring and the second end extends axially beyond the inner annular ring.

In still another aspect, a rotary machine is provided. The rotary machine includes at least one rotatable shaft, and at least one roller bearing assembly coupled to the at least one rotatable shaft. The at least one roller bearing assembly includes an inner annular ring, an outer annular ring, a plurality of roller elements, and a bearing cage. The bearing cage includes an annular body extending along an axial direction. The annular body is configured to be positioned between the inner annular ring and the outer annular ring and configured to receive the plurality of roller elements. The annular body includes a first end including a first inner radial surface opposite the inner annular ring. The annular body further includes a second end opposite the first end. The second end including a second inner radial surface opposite the inner annular ring. The first end extends axially beyond the inner annular ring and the second end extends axially beyond the inner annular ring.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged.

Such ranges are identified and include all the sub-ranges contained therein unless context or language indicates otherwise.

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine. In addition, as used herein, the terms "circumferential" and "circumferentially" refer to directions and orientations extending arcuately about a longitudinal axis of the gas turbine engine.

Embodiments of the present disclosure relate to bearing assemblies that facilitate reducing wear of the components therein. Specifically, in the exemplary embodiment, a bearing cage includes a first axial end and a second axial end that extend beyond an inner ring. As such, an increased bearing surface area is formed between the bearing cage and the inner ring that defines a thin annular film space. Oil received in the annular film space forms a protective oil film to absorb loading therein. In some embodiments, a flange is formed at each axial end of the bearing cage to increase oil retention with the annular film space and facilitate oil film formation. In other embodiments, a groove defined in a cross-rail extending between the first axial end and the second end facilitates channeling oil to the annular film space such that the oil film is formed. In yet other embodiments, a radial opening defined within the inner ring facilitates channeling oil to the annular film space such that the oil film is formed. In further embodiments, a wing is formed at each axial end of the bearing cage to facilitate channeling oil to the annular film space such that the oil film is formed. By forming an effective film space and providing a consistent flow of oil thereto, the embodiments of the bearing assemblies described herein reduce wear of the bearing cage and the inner ring.

Figure 1:
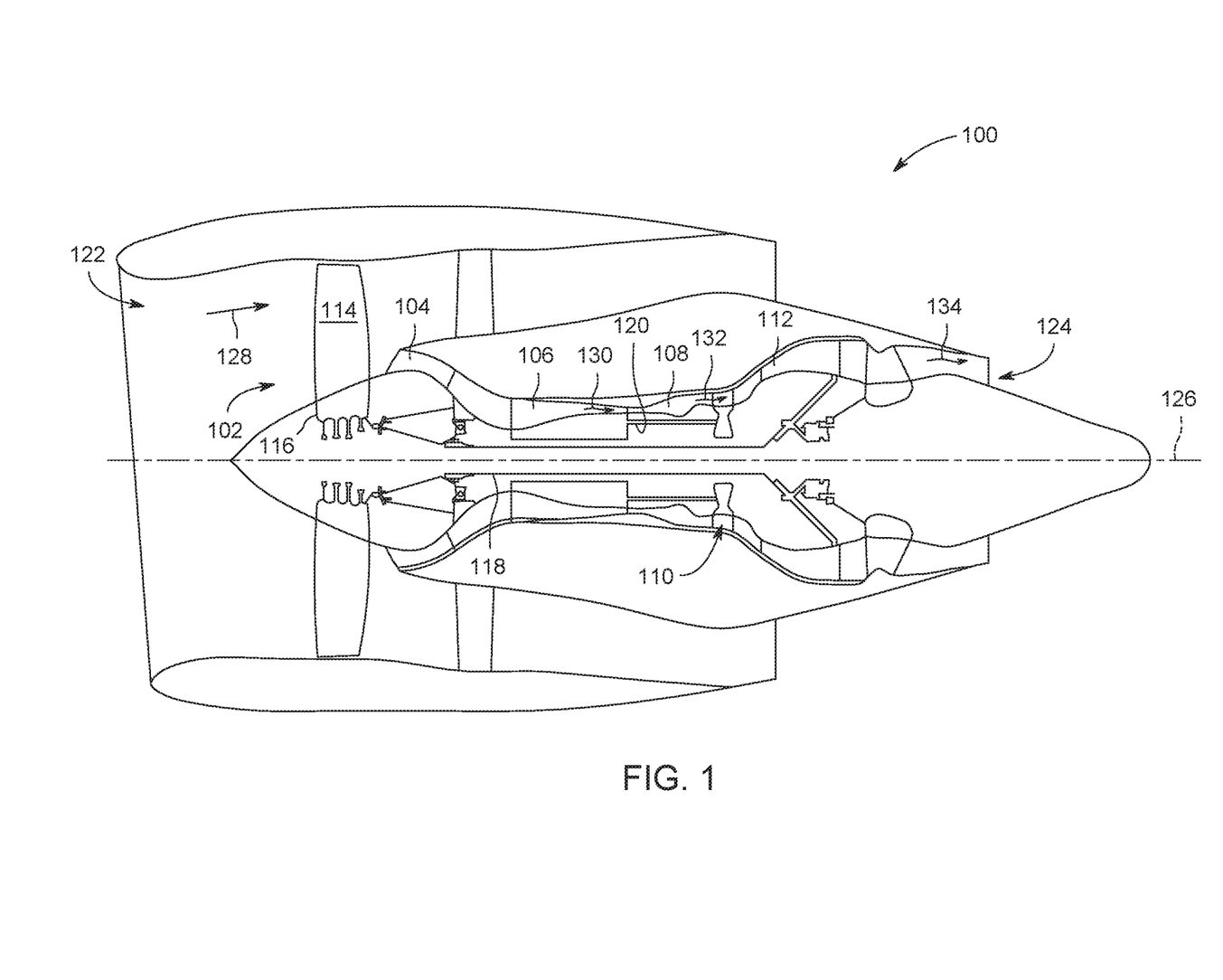
FIG. 1 is a schematic view of an exemplary rotor machine, i.e., a gas turbine engine.

FIG. 1 is a schematic view of a rotary machine 100, i.e., a turbomachine, and more specifically, a turbine engine. In the exemplary embodiment, turbine engine 100 is a gas turbine engine. Alternatively, turbine engine 100 is any other turbine engine and/or rotary machine, including, and without limitation, a steam turbine engine, an aircraft engine, a wind turbine, and a compressor. In the exemplary embodiment, gas turbine engine 100 includes a fan assembly 102, a low pressure or booster compressor 104, a high-pressure compressor 106, and a combustor 108. Fan assembly 102, booster compressor 104, high-pressure compressor 106, and combustor 108 are coupled in flow communication. Turbine engine 100 also includes a high-pressure turbine 110 coupled in flow communication with combustor 108 and a low-pressure turbine 112. Fan assembly 102 includes an array of fan blades 114 extending radially outward from a rotor disk 116. Low-pressure turbine 112 is coupled to fan assembly 102 and booster compressor 104 via a first drive shaft 118, and high-pressure turbine 110 is coupled to high-pressure compressor 106 via a second drive shaft 120. Turbine engine 100 has an intake 122 and an exhaust 124. Turbine engine 100 further includes a centerline 126 about which fan assembly 102, booster compressor 104, high-pressure compressor 106, and turbine assemblies 110 and 112 rotate.

In operation, intake 122 channels air 128 towards through fan assembly 102, as well as, booster compressor 104 and high-pressure compressor 106. Compressors 104 and 106 compresses inlet air 128 to higher pressures prior to discharging compressed air 130 towards combustor 108. Compressed air 130 is channeled to combustor 108 where it is mixed with fuel (not shown) and burned to generate high temperature combustion gases 132. Combustion gases 132 are channeled downstream towards high-pressure turbine 110 and low-pressure turbine 112, such that after impinging turbine blades (not shown) thermal energy is converted to mechanical rotational energy that is used to drive first drive shaft 118 and second drive shaft 120 respectively about centerline 126. Exhaust gases 134 then discharge through exhaust 124 to ambient atmosphere.

Figure 2:
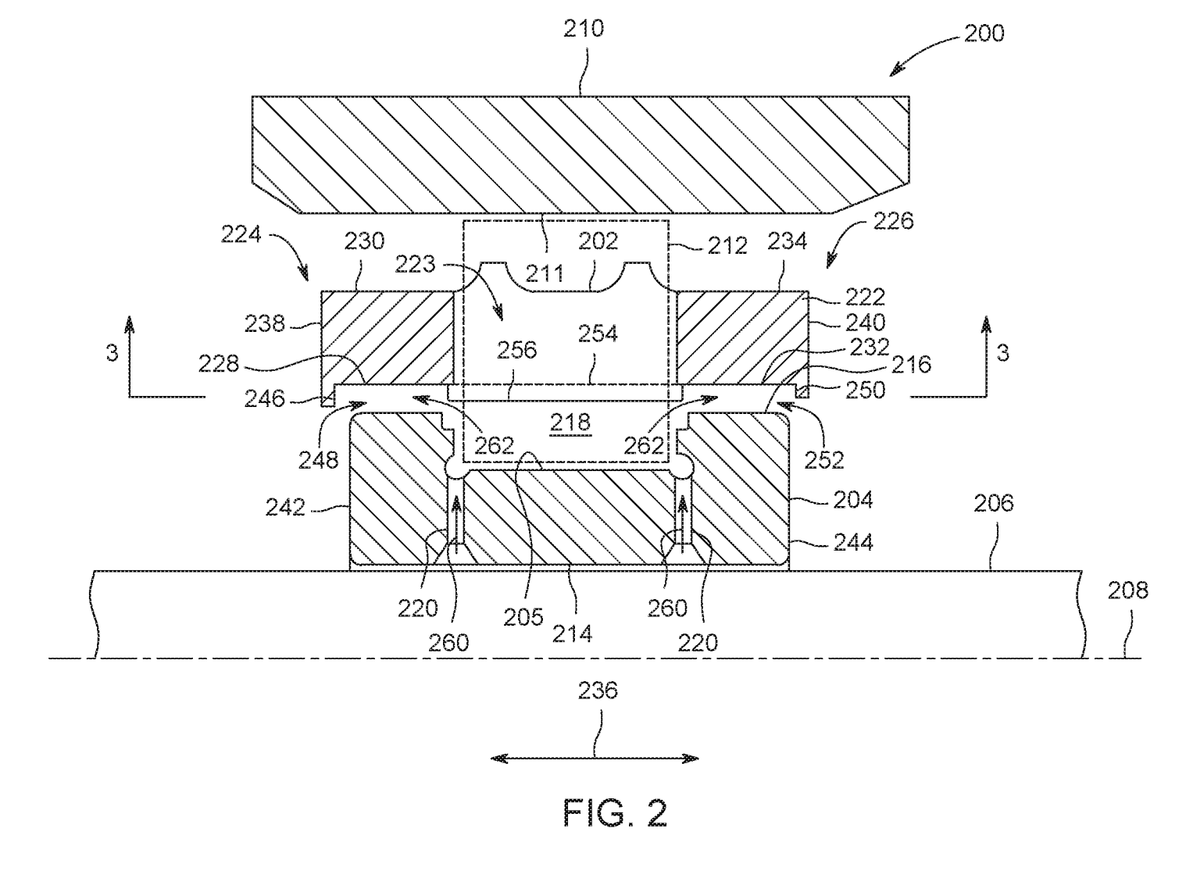
FIG. 2 is a cross-sectional view of an exemplary bearing assembly that may be used with the rotor machine shown in FIG. 1.
Figure 3:
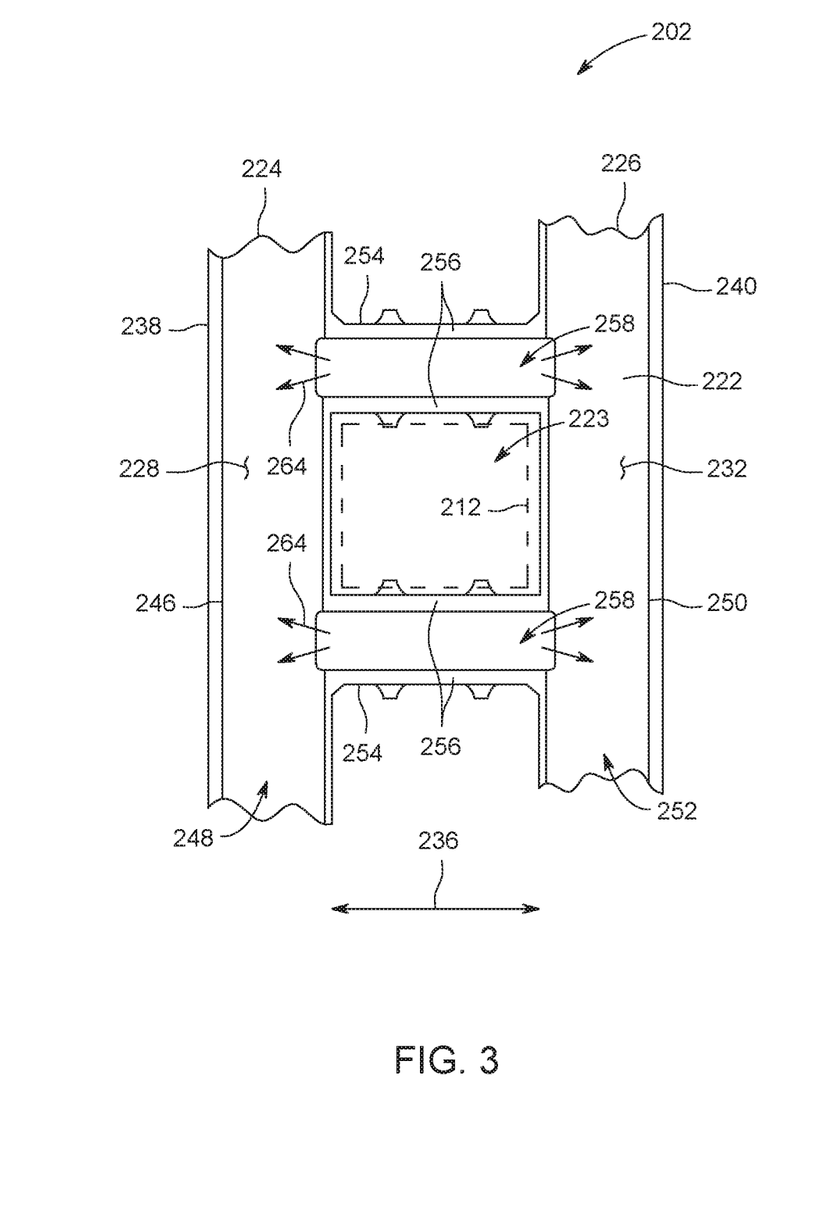
FIG. 3 is a plan view of an exemplary bearing cage taken along line 3-3 as shown in FIG. 2.

FIG. 2 is a cross-sectional view of an exemplary bearing assembly 200 that may be used with rotor machine 100 (shown in FIG. 1). FIG. 3 is a plan view of an exemplary bearing cage 202 taken along line 3-3 as shown in FIG. 2. Referring to FIGS. 2 and 3, in the exemplary embodiment, bearing assembly 200 includes an annular inner ring 204 including an inner race 205 mounted on a shaft 206 that is rotatable about a centerline 208. Bearing assembly 200 also includes an annular outer ring 210 including an outer race 211 that surrounds inner ring 204. Positioned between inner ring 204 and outer ring 210 are a plurality of circumferentially spaced cylindrical roller elements 212.

Inner ring 204 includes an inner radial surface 214 and an opposite outer radial surface 216. Outer radial surface 216 includes an outer radial cavity 218 defined therein and that along with inner race 205 facilitates receiving at least a portion of roller element 212. At least one first radial opening 220 is defined through inner ring 204 from inner radial surface 214 to outer radial cavity 218. First radial opening 220 facilitates channeling a lubricant, such as oil, into outer radial cavity 218.

Bearing cage 202 includes an annular body 222 that is positioned between inner ring 204 and outer ring 210. Annular body 222 includes a plurality of roller cavities 223 defined therein that facilitate receiving roller elements 212 and maintaining a position of roller elements 212 relative to one another. Annular body 222 includes a first end 224 and an opposite second end 226. First end 224 includes an inner radial surface 228 opposite inner ring outer radial surface 216 and a radially outer surface 230 opposite outer ring 210. Similarly, second end 226 includes an inner radial surface 232 opposite inner ring outer radial surface 216 and a radially outer surface 234 opposite outer ring 210. In the exemplary embodiment, inner radial surfaces 228 and 232 have a similar diameter about centerline 208. First end 224 and second end 226 define an axial direction 236. Along axial direction 236 first end 224 includes a first sidewall 238 and second end 226 includes a second sidewall 240. In the exemplary embodiment, first sidewall 238 axially extends beyond a first axial sidewall 242 of inner ring 204. Similarly, second sidewall 240 axially extends beyond a second axial sidewall 244 of inner ring 204.

In the exemplary embodiment, bearing cage 202 further includes a first flange 246 adjacent to first sidewall 238 at first end 224 that extends radially inward from inner radial surface 228 toward inner ring 204. As such, a first channel 248 is defined at first end 224 that facilitates receiving oil therethrough. Similarly, bearing cage 202 includes a second flange 250 adjacent to second sidewall 240 at second end 226 that extends radially inward from inner radial surface 232 toward inner ring 204. As such, a second channel 252 is defined at second end 226 that facilitates receiving oil therethrough. Additionally, bearing cage 202 includes a plurality of circumferentially spaced cross-rails 254 that extend between first end 224 and second end 226. Cross-rail 254 includes an inner radial surface 256 that has a groove 258 defined therein. Groove 258 is in fluid communication with both first channel 248 and second channel 252, and as such, groove 258 facilitates receiving oil and channeling the oil to first channel 248 and second channel 252. In the exemplary embodiment, cross-rail inner radial surface 256 has a diameter about centerline 208 that is less than the diameter of body inner radial surfaces 228 and 232. In alternative embodiments, cross-rail inner radial surface 256 has a diameter that is substantially equal to or greater than the diameter of body inner radial surfaces 228 and 232.

In operation, bearing assembly 200 facilitates supporting radial loads induced by shaft 206, and a lubricant, such as oil, is typically provided within bearing assembly 200 to reduce wear and reduce metal-to-metal contact of the components. For example, oil 260 is channeled through one or more radial openings 220 into inner ring outer radial cavity 218 to cool and lubricate roller element 212 therein. In a planetary bearing, with multiple axes of rotation, centrifugal forces increase contact between bearing cage 202 and inner ring 204, and thus accelerate wear. To reduce wear thereof, first channel 248 and second channel 252 define a thin annular oil film space that facilities forming a film of oil between bearing cage 202 and inner ring 204. A portion 262 of oil from roller element 212 is channeled through first and second channels 248 and 252 to facilitate forming the protective oil film. By axially extending both first end 224 and second end 226 beyond inner ring sidewalls 242 and 244 the bearing surface for the oil film is increased. Additionally, first flange 246 and second flange 250 facilitate retaining oil flow 262 within channels 248 and 252 such that oil film is formed. In some embodiments, groove 258 receives an oil flow from roller element 212 and channels oil 264 to first channel and second channel 252 to further facilitate oil flow therethrough and the formation of oil film within first channel 248 and second channel 252.

Figure 4:
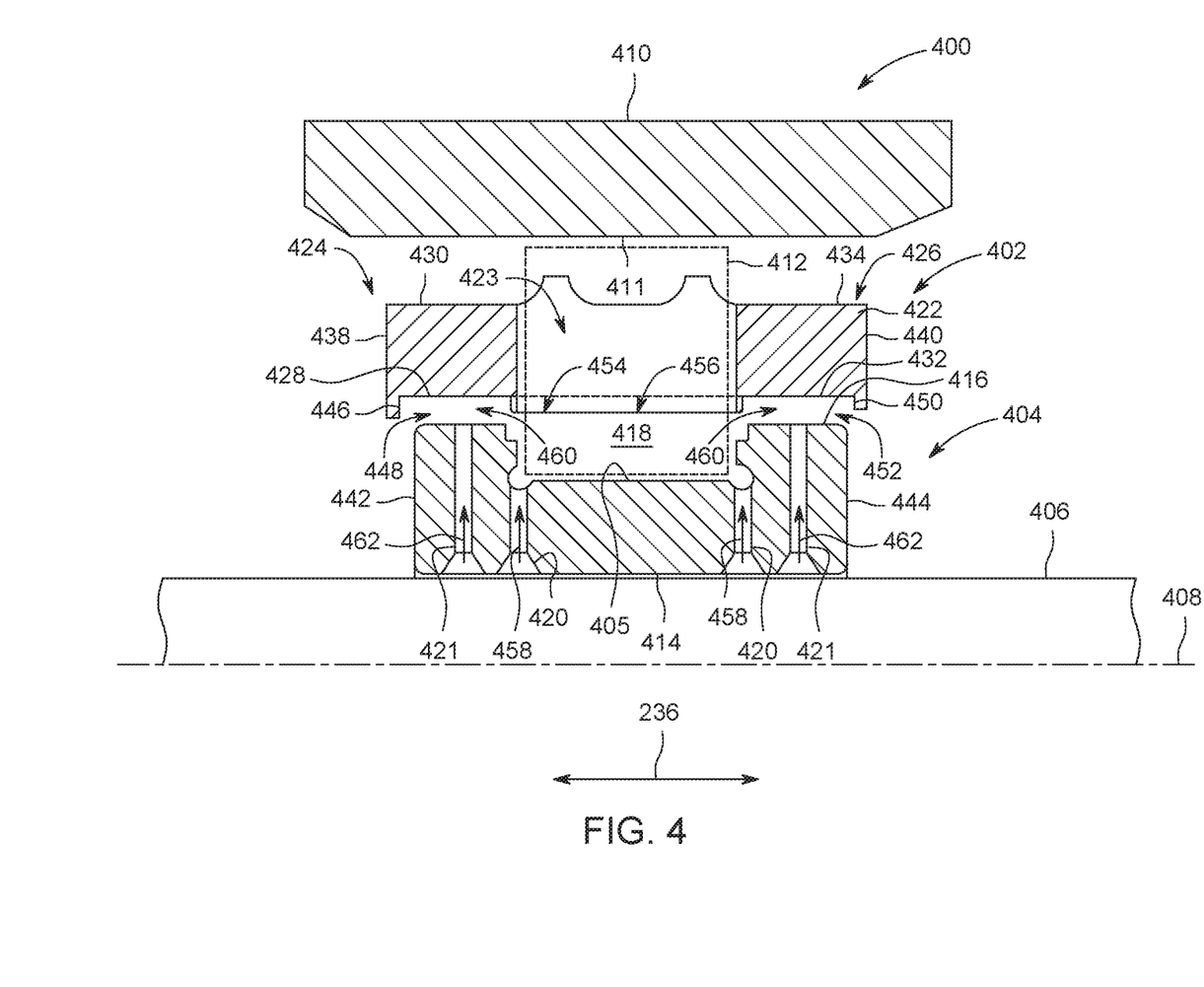
FIG. 4 is a cross-sectional view of another exemplary bearing assembly that may be used with the rotor machine shown in FIG. 1.

FIG. 4 is a cross-sectional view of another exemplary bearing assembly 400 that may be used with rotor machine shown 100 (shown in FIG. 1). In this embodiment, bearing assembly 400, similar to bearing assembly 200 (shown in FIG. 2 and described above), includes a bearing cage 402 and an annular inner ring 404 including an inner race 405 mounted on a shaft 406 that is rotatable about a centerline 408. Bearing assembly 400 also includes an annular outer ring 410 including an outer race 411 that surrounds inner ring 404 and bearing cage 402. Positioned between inner ring 404 and outer ring 410 are a plurality of circumferentially spaced cylindrical roller elements 412.

Inner ring 404 includes an inner radial surface 414 and an opposite outer radial surface 416. Outer radial surface 416 includes an outer radial cavity 418 defined therein and that along with inner race 405 facilitates receiving at least a portion of roller element 412. In this embodiment, at least one first radial opening 420 is defined through inner ring 404 from inner radial surface 414 to outer radial cavity 418. Additionally, at least one second radial opening 421 is defined through inner ring 404 from inner radial surface 414 to outer radial surface 416. First radial opening 420 facilitates channeling a lubricant, such as oil, into outer radial cavity 418. Second radial opening 421 facilitates channeling the lubricant into first channel 448 and/or second channel 452 (each described further below).

Bearing cage 402 includes an annular body 422 that is positioned between inner ring 404 and outer ring 410. Annular body 422 includes a plurality of roller cavities 423 defined therein that facilitate receiving roller elements 412 and maintaining a position of roller elements 412 relative to one another. Annular body 422 includes a first end 424 and an opposite second end 426. First end 424 includes an inner radial surface 428 opposite inner ring outer radial surface 416 and a radially outer surface 430 opposite outer ring 410. Similarly, second end 426 includes an inner radial surface 432 opposite inner ring outer radial surface 416 and a radially outer surface 434 opposite outer ring 410. In the exemplary embodiment, inner radial surfaces 428 and 432 have a similar diameter about centerline 408. First end 424 and second end 426 define an axial direction 236. Along axial direction 236 first end 424 includes a first sidewall 438 and second end 426 includes a second sidewall 440. In this embodiment, first sidewall 438 axially extends beyond a first axial sidewall 442 of inner ring 404. Similarly, second sidewall 440 axially extends beyond a second axial sidewall 444 of inner ring 404.

In this embodiment, bearing cage 402 further includes a first flange 446 adjacent to first sidewall 438 at first end 424 that extends radially inward from inner radial surface 428 toward inner ring 404. As such, a first channel 448 is defined at first end 424 that facilitates receiving oil therethrough. Similarly, bearing cage 402 includes a second flange 450 adjacent to second sidewall 440 at second end 426 that extends radially inward from inner radial surface 432 toward inner ring 404. As such, a second channel 452 is defined at second end 426 that facilitates receiving oil therethrough. Additionally, bearing cage 402 includes a plurality of circumferentially spaced cross-rails 454 that extend between first end 424 and second end 426. Cross-rail 454 includes an inner radial surface 456. In some embodiments, inner radial surface has a groove, similar to groove 258 (shown in FIGS. 2 and 3) defined therein. In this embodiment, cross-rail inner radial surface 456 has a diameter about centerline 408 that is less than the diameter of body inner radial surfaces 428 and 432.

In operation, similar to bearing assembly 200 (shown in FIG. 2), first channel 448 and second channel 452 define a thin annular oil film space that facilities forming a film of oil between bearing cage 402 and inner ring 404. For example, oil 458 is channeled through one or more first radial openings 420 into inner ring outer radial cavity 418 to cool and lubricate roller element 412 therein. A portion 460 of oil from roller element 412 through cross-rail 454 is channeled through first and second channels 448 and 452 to facilitate forming the protective oil film. Additionally, in this embodiment, oil 462 is channeled through one or more second radial openings 421 into first channel 448 and/or second channel 452 to facilitate oil flow therethrough and formation of oil film therein.

Figure 5:
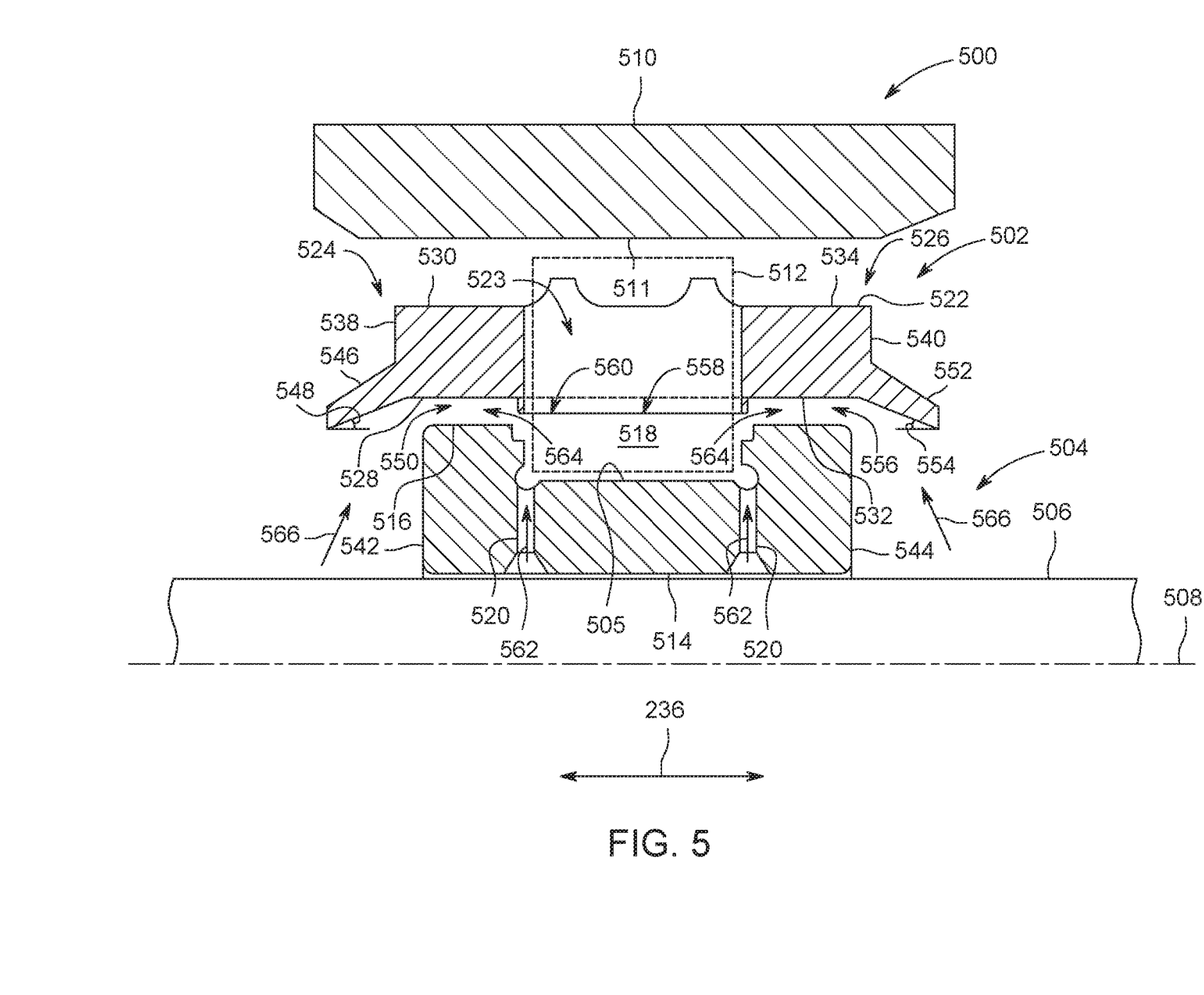
FIG. 5 is a cross-sectional view of a further exemplary bearing assembly that may be used with the rotor machine shown in FIG. 1.

FIG. 5 is a cross-sectional view of a further exemplary bearing assembly (500) that may be used with rotor machine 100 (shown in FIG. 1). In this embodiment, bearing assembly 500, similar to bearing assemblies 200 and 400 (shown in FIGS. 2 and 4 respectively and described above), includes a bearing cage 502 and an annular inner ring 504 including an inner race 505 mounted on a shaft 506 that is rotatable about a centerline 508. Bearing assembly 500 also includes an annular outer ring 510 including an outer race 511 that surrounds inner ring 504 and bearing cage 502. Positioned between inner ring 504 and outer ring 510 are a plurality of circumferentially spaced cylindrical roller elements 512.

Inner ring 504 includes an inner radial surface 514 and an opposite outer radial surface 516. Outer radial surface 516 includes an outer radial cavity 518 defined therein and that along with inner race 505 facilitates receiving at least a portion of roller element 512. In this embodiment, at least one first radial opening 520 is defined through inner ring 504 from inner radial surface 514 to outer radial cavity 518. First radial opening 520 facilitates channeling a lubricant, such as oil, into outer radial cavity 518.

Bearing cage 502 includes an annular body 522 that is positioned between inner ring 504 and outer ring 510. Annular body 522 includes a plurality of roller cavities 523 defined therein that facilitate receiving roller elements 512 and maintaining a position of roller elements 512 separate from one another. Annular body 522 includes a first end 524 and an opposite second end 526. First end 524 includes an inner radial surface 528 opposite inner ring outer radial surface 516 and a radially outer surface 530 opposite outer ring 510. Similarly, second end 526 includes an inner radial surface 532 opposite inner ring outer radial surface 516 and a radially outer surface 534 opposite outer ring 510. In the exemplary embodiment, inner radial surfaces 528 and 532 have a similar diameter about centerline 508. First end 524 and second end 526 define an axial direction 236. Along axial direction 236 first end 524 includes a first sidewall 538 and second end 526 includes a second sidewall 540. In this embodiment, first sidewall 538 axially extends beyond a first axial sidewall 542 of inner ring 504. Similarly, second sidewall 540 axially extends beyond a second axial sidewall 544 of inner ring 504.

In this embodiment, bearing cage 502 further includes a first wing 546 adjacent to first sidewall 538 at first end 524 that extends axially outward from first sidewall 538. First wing 546 is formed at a first angle 548, such that a first channel 550 is defined at first end 524 that facilitates receiving oil therethrough. Similarly, bearing cage 502 includes a second wing 552 adjacent to second sidewall 540 at second end 526 that extends axially outward from second sidewall 540. Second wing 552 is formed at a second angle 554, such that a second channel 556 is defined at second end 526 that facilitates receiving oil therethrough. Additionally, bearing cage 502 includes a plurality of circumferentially spaced cross-rails 558 that extend between first end 524 and second end 526. Cross-rail 558 includes an inner radial surface 560. In some embodiments, inner radial surface has a groove, similar to groove 258 (shown in FIGS. 2 and 3) defined therein. In this embodiment, cross-rail inner radial surface 560 has a diameter about centerline 508 that is less than the diameter of body inner radial surfaces 528 and 532.

In operation, similar to bearing assemblies 200 and 400 (shown in FIGS. 2 and 4 respectively), first channel 550 and second channel 556 define a thin annular oil film space that facilities forming a film of oil between bearing cage 502 and inner ring 504. For example, oil 562 is channeled through one or more first radial openings 520 into inner ring outer radial cavity 518 to cool and lubricate roller element 512 therein. A portion 564 of oil from roller element 512 is channeled through first and second channels 550 and 556 to facilitate forming the protective oil film. Additionally, in this embodiment, wings 546 and 552 catch and trap oil 566 that is sprayed from an oil nozzle (not shown) to channel into first channel 550 and/or second channel 556 to facilitate oil flow therethrough and formation of oil film therein.

The above-described embodiments provide efficient bearing assemblies for reducing wear of the components therein. Specifically, in the exemplary embodiment, a bearing cage includes a first axial end and a second axial end that extend beyond an inner ring. As such, an increased bearing surface area is formed between the bearing cage and the inner ring that defines a thin annular film space. Oil received in the annular film space forms a protective oil film to absorb loading therein. In some embodiments, a flange is formed at each axial end of the bearing cage to increase oil retention with the annular film space and facilitate oil film formation. In other embodiments, a groove defined in a cross-rail extending between the first axial end and the second end facilitates channeling oil to the annular film space such that the oil film is formed. In yet other embodiments, a radial opening defined within the inner ring facilitates channeling oil to the annular film space such that the oil film is formed. In further embodiments, a wing is formed at each axial end of the bearing cage to facilitate channeling oil to the annular film space such that the oil film is formed. By forming an effective film space and providing a consistent flow of oil thereto, the embodiments of the bearing assemblies described herein reduce wear of the bearing cage and the inner ring.

An exemplary technical effect of the systems and methods described herein includes at least one of: (a) forming an effective bearing area with an oil film to reduce wear within a bearing assembly; (b) continuously channeling a flow of oil to form the oil film; (c) reducing wear between a bearing cage and an inner ring in the bearing assembly; and (d) increasing bearing assembly efficiency.

Exemplary embodiments of systems and methods for reducing wear in a bearing assembly are described above in detail. The methods and systems are not limited to the specific embodiments described herein, but rather, components of systems and/or steps of the methods may be utilized independently and separately from other components and/or steps described herein. For example, the method may also be used in combination with other turbine components, and are not limited to practice only with the roller bearing assemblies as described herein. Rather, the exemplary embodiment can be implemented and utilized in connection with many other gas turbine engine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A roller bearing assembly comprising:
a bearing cage;
an inner annular ring having a first axial sidewall and a second axial sidewall;
an outer annular ring; and
a plurality of roller elements,
said bearing cage comprising:
an annular body extending in an axial direction, said annular body configured to be positioned between the inner annular ring and the outer annular ring and configured to receive the plurality of roller elements, said annular body comprising:
a first end comprising a first inner radial surface opposite the inner annular ring, a first outer radial surface opposite the outer annular ring, and a first annular sidewall extending between the first inner radial surface and the first outer radial surface; and a second end opposite said first end, said second end comprising a second inner radial surface opposite the inner annular ring, a second outer radial surface opposite the outer annular ring, and a second annular sidewall extending between the first inner radial surface and the first outer radial surface, wherein said first end extends axially beyond the inner annular ring and said second end extends axially beyond the inner annular ring, and wherein a first distance between the first annular sidewall and the second annular sidewall is greater than a second distance between the first axial sidewall of the inner annular ring and the second axial sidewall of the inner annular ring.

2. The roller bearing assembly in accordance with claim 1, wherein said annular body further comprises:
a first flange extending from said first end toward the inner annular ring, said first flange and said first inner radial surface define a first channel configured to receive oil and form a first film of oil therethrough; and
a second flange extending from said second end toward the inner annular ring, said second flange and said second inner radial surface define a second channel configured to receive oil and form a second film of oil therethrough.

3. The roller bearing assembly in accordance with claim 2, the first end further comprising a first side wall;
the second end comprising a second sidewall,
wherein said annular body further comprises a plurality of cross-rails extending axially between said first end and said second end, said plurality of cross-rails comprising a third radial surface opposite the inner annular ring, said third radial surface defining an axial groove configured to receive oil and channel the oil to at least one of said first channel and said second channel,
wherein the first flange is adjacent the first sidewall, and wherein the second flange is adjacent the second sidewall.

4. The roller bearing assembly in accordance with claim 3, wherein said first inner radial surface and said second inner radial surface have a first diameter and said third radial surface has a second diameter, the first diameter greater than the second diameter.

5. The roller bearing assembly in accordance with claim 1, wherein said annular body further comprises:
a first wing extending axially outward from said first end, said first wing and said first inner radial surface define a first channel configured to receive oil and form a first film of oil therethrough; and
a second wing extending axially outward from said second end, said second wing and said second inner radial surface define a second channel configured to receive oil and form a second film of oil therethrough.

6. The roller bearing assembly in accordance with claim 5, wherein said first wing is formed at a first angle from said first inner radial surface, and said second wing is formed at a second angle from said second inner radial surface.

7. A roller bearing assembly comprising:
an inner annular ring having a first axial sidewall and a second axial sidewall, wherein said inner annular ring defines at least one first radial opening extending through said inner annular ring towards at least one of a first channel and a second channel;
an outer annular ring;
a plurality of roller elements; and
a bearing cage comprising:
an annular body extending along an axial direction, said annular body configured to be positioned between said inner annular ring and said outer annular ring and configured to receive said plurality of roller elements, said annular body comprising:
a first end comprising a first inner radial surface opposite said inner annular ring, a first outer radial surface opposite the outer annular ring, and a first annular sidewall extending between the first inner radial surface and the first outer radial surface; and
a second end opposite said first end, said second end comprising a second inner radial surface opposite said inner annular ring, a second outer radial surface opposite the outer annular ring, and a second annular sidewall extending between the first inner radial surface and the first outer radial surface, wherein said first end extends axially beyond said inner annular ring and said second end extends axially beyond said inner annular ring, wherein a first distance between the first annular sidewall and the second annular sidewall is greater than a second distance between the first axial sidewall of the inner annular ring and the second axial sidewall of the inner annular ring, and wherein oil is channeled through each of the at least one first radial opening and at least one of the at least one second radial opening into at least one of the first channel and the second channel to facilitate a formation of oil film therein.

8. The roller bearing assembly in accordance with claim 7, wherein said annular body further comprises:
a first flange extending from said first end toward said inner annular ring, said first flange and said first inner radial surface define a first channel configured to receive oil and form a first film of oil therethrough; and
a second flange extending from said second end toward said inner annular ring, said second flange and said second inner radial surface define a second channel configured to receive oil and form a second film of oil therethrough.

9. The roller bearing assembly in accordance with claim 8, wherein said inner annular ring defines at least one first radial opening extending through said inner annular ring towards at least one of said first channel and said second channel, said at least one first radial opening configured to channel oil towards both said first channel and said second channel.

10. The roller bearing assembly in accordance with claim 8, wherein said annular body further comprises a plurality of cross-rails extending axially between said first end and said second end, said plurality of cross-rails comprising a third radial surface opposite said inner annular ring, said third radial surface defining an axial groove configured to receive oil and channel the oil to at least one of said first channel and said second channel,
wherein said third radial surface comprises a diameter less than a diameter of both of the first inner radial surface and the second inner radial surface.

11. The roller bearing assembly in accordance with claim 10, wherein said first inner radial surface and said second inner radial surface have a first diameter and said third radial surface has a second diameter, the first diameter greater than the second diameter.

12. The roller bearing assembly in accordance with claim 8, wherein said annular body further comprises:
a first wing extending axially outward from said first end, said first wing and said first inner radial surface define a first channel configured to receive oil and form a first film of oil therethrough; and a second wing extending axially outward from said second end, said second wing and said second inner radial surface define a second channel configured to receive oil and form a second film of oil therethrough.

13. The roller bearing assembly in accordance with claim 12, wherein said first wing is formed at a first angle from said first inner radial surface, and said second wing is formed at a second angle from said second inner radial surface, and wherein said first wing and said second wing catch and trap oil to channel into at least one of the first channel and the second channel.

14. A rotary machine comprising:

at least one rotatable shaft; and at least one roller bearing assembly coupled to said at least one rotatable shaft, said at least one roller bearing assembly comprising:

an inner annular ring having a first axial sidewall and a second axial sidewall;

an outer annular ring;

a plurality of roller elements; and a bearing cage comprising:

an annular body extending along an axial direction, said annular body configured to be positioned between said inner annular ring and said outer annular ring and configured to receive said plurality of roller elements, said annular body comprising:

a first end comprising a first inner radial surface opposite said inner annular ring, a first outer radial surface opposite the outer annular ring, and a first annular sidewall extending between the first inner radial surface and the first outer radial surface; and a second end opposite said first end, said second end comprising a second inner radial surface opposite said inner annular ring, a second outer radial surface opposite the outer annular ring, and a second annular sidewall extending between the first inner radial surface and the first outer radial surface, wherein said first end extends axially beyond said inner annular ring and said second end extends axially beyond said inner annular ring, and wherein a first distance between the first annular sidewall and the second annular sidewall is greater than a second distance between the first axial sidewall of the inner annular ring and the second axial sidewall of the inner annular ring.

15. The rotary machine in accordance with claim 14, wherein said annular body further comprises:

a first flange extending from said first end toward said inner annular ring, said first flange and said first inner radial surface define a first channel configured to receive oil and form a first film of oil therethrough; and a second flange extending from said second end toward said inner annular ring, said second flange and said second inner radial surface define a second channel configured to receive oil and form a second film of oil therethrough.

16. The rotary machine in accordance with claim 15, wherein said inner annular ring defines at least one first radial opening extending through said inner annular ring towards at least one of said first channel and said second channel, said at least one first radial opening configured to channel oil towards both said first channel and said second channel, and wherein said inner annular ring defines at least one second radial opening extending through said inner annular ring towards at least one of said first channel and said second channel, said at least one second radial opening configured to channel oil towards both said first channel and said second channel.

17. The rotary machine in accordance with claim 15, wherein said annular body further comprises a plurality of cross-rails extending axially between said first end and said second end, said plurality of cross-rails comprising a third radial surface opposite said inner annular ring, said third radial surface defining an axial groove configured to receive oil and channel the oil to at least one of said first channel and said second channel.

18. The rotary machine in accordance with claim 17, wherein said first inner radial surface and said second inner radial surface have a first diameter and said third radial surface has a second diameter, the first diameter greater than the second diameter.

19. The rotary machine in accordance with claim 14 wherein said annular body further comprises:

a first wing extending axially outward from said first end, said first wing and said first inner radial surface define a first channel configured to receive oil and form a first film of oil therethrough; and a second wing extending axially outward from said second end, said second wing and said second inner radial surface define a second channel configured to receive oil and form a second film of oil therethrough, wherein each of said at least one first radial opening is axially inward of each of said at least one second radial opening.

20. The rotary machine in accordance with claim 19, wherein said first wing is formed at a first angle from said first inner radial surface, and said second wing is formed at a second angle from said second inner radial surface, and wherein oil is channeled through each of the at least one first radial opening and each of the at least one second radial opening into at least one of the first channel and the second channel to facilitate a formation of oil film therein.

* * * * *